United States Patent

[11] 3,524,461

| [72] | Inventors | Cyrille F. Pavlin<br>Jouy-en-Josas, Yvelines, France;<br>Pierre J. A. Facon, La Verriere, Yvelines,<br>France; Gérard D. G. Breant, Versailles,<br>Yvelines, France |
|------|-----------|---|
| [21] | Appl. No. | 720,542 |
| [22] | Filed | April 11, 1968 |
| [45] | Patented | Aug. 18, 1970 |
| [73] | Assignee | Societe Bertin et Cie<br>Paris, France<br>a French body corporate |
| [32] | Priority | April 21, 1967, Feb. 28, 1968 |
| [33] | | France |
| [31] | | Nos. 103,679 and 141,616 |

[54] FLUID LOGIC ELEMENT
23 Claims, 18 Drawing Figs.

| [52] | U.S. Cl. | 137/81.5 |
|------|----------|----------|
| [51] | Int. Cl. | F15c 1/08 |
| [50] | Field of Search | 137/81.5 |

[56] References Cited
UNITED STATES PATENTS

| 3,187,763 | 6/1965 | Adams | 137/81.5 |
|-----------|--------|-------|----------|
| 3,193,197 | 7/1965 | Bauer | 137/81.5X |
| 3,223,101 | 12/1965 | Bowles | 137/81.5 |
| 3,226,023 | 12/1965 | Horton | 137/81.5X |
| 3,267,949 | 8/1966 | Adams | 137/81.5 |
| 3,275,016 | 9/1966 | Wood | 137/81.5 |
| 3,326,227 | 6/1967 | Mitchell | 137/81.5 |
| 3,326,463 | 6/1967 | Reader | 137/81.5X |
| 3,420,253 | 1/1969 | Griffin | 137/81.5 |
| 3,425,432 | 2/1969 | Langley | 137/81.5 |

*Primary Examiner—* Samuel Scott
*Attorney—* Watson, Cole, Grindle and Watson

ABSTRACT: This invention comprehends a fluid logic element operated by pressure fluids and serving to direct a fluid stream in various directions in dependence upon appropriate actuation, the fluid logic element comprising a nozzle of a fluid trigger extending into a reflection chamber for delivering a fluid stream into said chamber so that said stream divides said chamber into two compartments, means defining an exit orifice from said chamber, of substantially the same cross-section as said stream, between two convergent walls of said chamber, and means to produce pressure differences as between the two compartments so as to deflect said stream, said exit orifice being followed by divergent walls for guiding the deflected stream towards appropriate exit passages.

FLUID LOGIC ELEMENT

This invention relates to a fluid logic element operated by pressure fluids in liquid or gas form, e.g. compressed air, and serving to direct a fluid stream in various directions in dependence upon appropriate actuation.

According to the invention, in a fluid logic element the nozzle of a fluid trigger extends into a reflection chamber for delivering a fluid stream into said chamber so that said stream divides said chamber into two compartments, said chamber being formed with an exit orifice, of substantially the same cross-section as the stream, between two convergent walls of the chamber, means being provided to produce pressure differences as between the two compartments so as to deflect the stream, the exit orifice being followed by divergent walls for guiding the deflected stream towards appropriate exit passages.

If the logic element or at least its chamber is symmetrical of the nozzle centre plane, stable operation in both the directions of the exit stream is obtained and the element is a bistable. If sufficient asymmetry is introduced, the stream tends to be deflected in a privileged or preferred direction and the element is a monostable.

The element, whether bistable or monostable, operates by the fluid stream being reflected on one of the convergent walls of the chamber, the exit stream being guided along the opposite divergent wall towards the corresponding exit passage. If inter alia deflection is produced by a pressure fluid entering one of the reflection chamber compartments, the fact that the stream exits at the side where the actuation occurs means that, if required, an active negative feedback of the exit on the actuation can be provided and that the logic elements of a system disposed in a single plane can be interconnected without the passages crossing one another.

Advantageously, the reflection chamber exit orifice dimensions are such relatively to the cross-section of the stream - and therefore to the nozzle exit cross-section - that the pressure tends to increase in the reflection chamber. Consequently, the element can be actuated without the need for any actuating fluid delivery, and so a single element can actuate a large number of other elements.

The element can operate as an ordinary trigger and provide various functions such as "and," "or," "nor" etc. The logic elements provided by the invention are very stable and can "hold" the load, and can therefore be used to control elements, such as distributors or manocontactors which of course operate with a zero continuous rate of flow.

The invention can be readily understood from the following description, with reference to the accompanying exemplary non-limitative drawings; features disclosed thereby and by the text form of course part of the invention.

Figure 1:
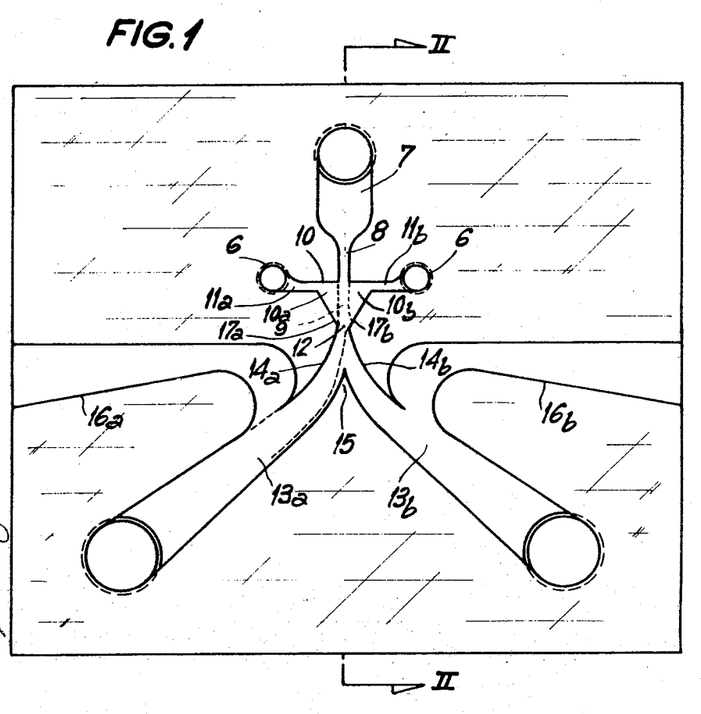
FIGURE 1 is a view, in section on the line I-I of FIGURE 2, of a bistable logic element according to the invention.
Figure 2:
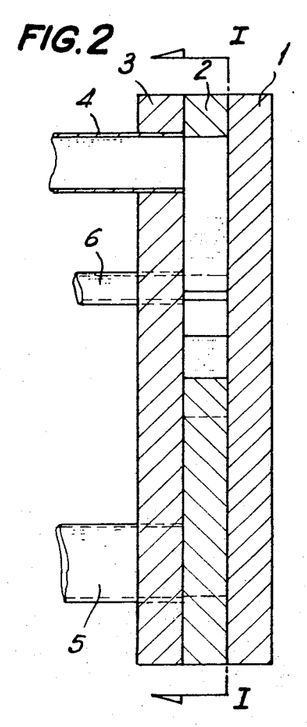
FIGURE 2 is a view in section on the line II-II of FIGURE 1.

In the embodiment shown in FIGURES 1 and 2, a logic element comprises three plates or sheets of some appropriate material - e.g. plastics or metal or the like - which is compatible with the fluids used; the three sheets are assembled in hermetic face-to-face relationship. The rear sheet 1 is solid, the central sheet 2 is perforated to form the chambers and ducting to be described hereinafter, and the front plate 3 is pierced with apertures for the connection of supply tubing 4, exit tubing 5 and actuating tubing 6.

The central sheet 2 is formed opposite the supply tubing or duct 4 with a cavity 7 which terminates in a relatively narrow rectangular passage, preferably having parallel surfaces, and which forms an input or entry nozzle 8 of the logic element. The nozzle 8 is adapted to deliver a stream 9, the same entering a reflection chamber 10 which is of constant thickness and which is in cross-section shaped substantially like an isosceles or, preferably, equilateral triangle. The stream 9 enters the chamber 10 perpendicularly to one of the sides of the triangular cross-section. Control passages 11a, 11b extend from the vertices at each end of such side to the actuating tubes 6. At the third vertex there is a rectangular exit or output orifice 12 whose width is of the same order as the width of the orifice of the input nozzle 8. Connected to the output orifice 12 are exit or output passages 13a, 13b bounded at their origin by side walls 14a, 14b, which can be curvilinear or plane, and by a pointed central apex 15. The passages 13a, 13b diverge at a reduced angle, e.g. of from about 7 to 11°, so that the stream is recompressed as a result of the progressive increase in flow cross-section presented to it. The passages 13a, 13b extend to the exit passages 5 through which the fluid goes to appropriate loads. Leakage ducts 16a, 16b are connected laterally to the exit passages 13a, 13b; the ducts 16a, 16b extend to a medium at a lower pressure than the pressure of the stream - e.g. atmosphere if a stream of compressed gas such as air is input to the logic element. As can be seen in FIGURE 1, the ducts 16a, 16b join the passages 13a, 13b at an inclination directed upstream, then extend as a wide elbow and then diverge towards the end walls of the central sheet or plate 2.

In the embodiment shown in FIGURES 1 and 2, the output orifice 12 is disposed opposite the nozzle 8 and the logic element reflection chamber 10 is symmetrical of the nozzle centre plane.

Figure 3:
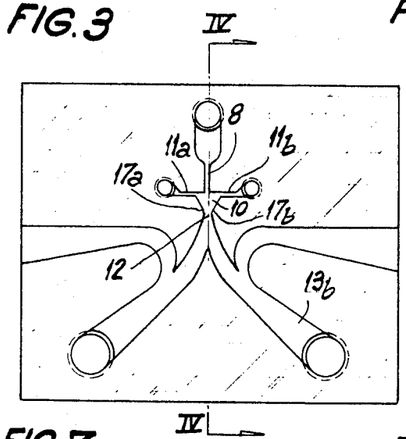
FIGURE 3 is a view, in section on the line III-III of FIGURE 4, of a monostable logic element.
Figure 4:
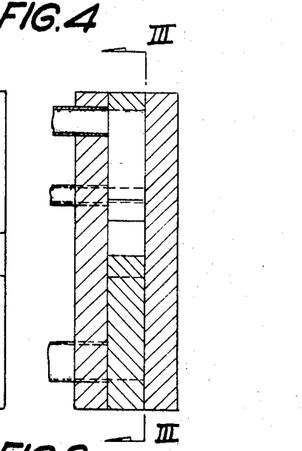
FIGURE 4 is a section on the line IV-IV of FIGURE 3.

In the variant shown in FIGURES 3 and 4, the nozzle 8 is offset slightly to the left of the output orifice 12.

The logic element just described operates as follows:

Referring first to the symmetrical embodiment shown in FIGURE 1, the stream 9 delivered by the nozzle 8 divides the chamber 10 into two lateral compartments 10a, 10b. If the width of the output orifice 12 is at least equal to stream width, the stream can pass readily through the orifice 12 and the pressure set up in the compartments 10a, 10b tends to be less than the pressure in the control passages 6; for instance, if the control passages 6 are connected to atmosphere, the pressure in the compartments 10a, 10b will tend to be less than atmospheric pressure. If a pressure difference occurs between the compartments 10a and 10b, for instance, by a control stream being applied through the passage 11a, the main stream is urged towards chamber wall 17b and, reflected thereby, departs via the channel 13a along the wall 14a. To reverse the position of the main stream, the actuating stream applied via the channel 11a is cut off and an actuating fluid stream is applied via the passage 11b.

The main stream leaves through that passage which is disposed on the same side as the actuating or control passage via which the actuating stream of fluid is applied.

If the width of the output orifice 12 is less than main stream width, the operation differs slightly from what has just been described in that the pressure in the chamber 10 tends to be greater in proportion as the orifice 12 is narrower. In practice, since the main stream widens as the fluid moves away from the nozzle orifice, the same effect can be obtained if the output orifice 12 has the same width as the exit cross-section of the nozzle 8.

The device has a slight tendency to be biased towards operation in one particular direction at start-up. If perfect symmetry could be achieved and if the pressure in the two control passages 11a, 11b was the same, there would be no reason for the main stream to deflect to either hand. Since perfect symmetry is unattainable in practice, the main stream is always deflected slightly in the conditions assumed.

To clarify the explanation, it will be assumed that this initial deflection is to the right. The right-hand edge of the stream meets the end of the wall 17b forming the lateral boundary of the chamber 10. Consequently, a small proportion of the fluid mass returns to the chamber side 10b, loses a portion to the passage 11b, and is in other respects sucked back by aspiration into the main body of the stream. Because of the reflection on the wall 17b the remainder of the stream is deflected to the left and, being unable to completely depart through the orifice 12, divides into two flows - one along the wall 14a, departing through the exit passage 13a, and the other onto the end of the wall 17a of chamber 10. Some of the flow which strikes the wall 17a goes to the passage 11a and the remainder is sucked back into the main stream. Since the incidence of the deflected flow striking the wall 17a is greater than the incidence of the stream portion striking the wall 17b, the fluid mass tending to accumulate in compartment 10a is greater than the fluid mass tending to accumulate in the other compartments, with the result that a slight excess pressure is produced in the compartment 10a and tends to boost or at least maintain the deflection of the stream. However, the excess pressure is small and if overcome - i.e., if the pressure can increase sufficiently in the compartment 10b - stream deflection reverses and the events described change direction.

As in the form of operation previously described, the device can be actuated by either of the actuating passages 6 being supplied with an appropriate pressure fluid; in practice, however, since fluid always tends to escape via the control passages, actuation can be produced just by blocking the control passage on the side to which deflection is required. For instance, in the start-up case just described, where the stream is deflected first to the right and then to the exit passage 13a, if the escape of fluid through the passage 11b is inhibited, the pressure in the compartment 10b gradually rises and the stream deflects towards the wall 17a, with the result that the logic element reverses or "flip-flops", the main stream then departing through the exit passage 13b.

To prevent operation of the element from disturbances, fluid can escape through the ducts 16a, 16b if the rate of flow in the passages 13a or 13b decreases for any reason.

The position and shape of the ducts 16a, 16b depends upon pressure requirements in the element. The angle at which the ducts 16a, 16b are connected to the output passages 13a, 13b is such that the ducts 16a, 16b can, by aspirator action, help to increase the output rate of flow through the load tubes.

With the symmetrical arrangement shown in FIGURES 1 and 2, the logic elements can operate in both directions with comparable conditions of stability and can be considered to be a bistable, but the element shown in FIGURES 3 and 4 differs slightly in that it is asymmetrical, the nozzle 8 not being disposed exactly opposite the output orifice 12 of the chamber 10. Consequently, if the pressure in the control passages 11a, 11b is assumed to be the same, the main stream strikes the edge of the wall 17a and is therefore deflected towards the output passage 13b. The element is monostable since special actuation - i.e., sufficient excess pressure in the compartment 10a - is required to deflect the main stream into the output passage 13a. Upon the cessation of actuation the element changes over automatically, the main stream returning to the passage 13b, which is called the "preferred" passage. Of course, asymmetry in the other direction would make the channel 13a the preferred channel. In other respects, the monostable element operates exactly like the bistable element.

Figure 5:
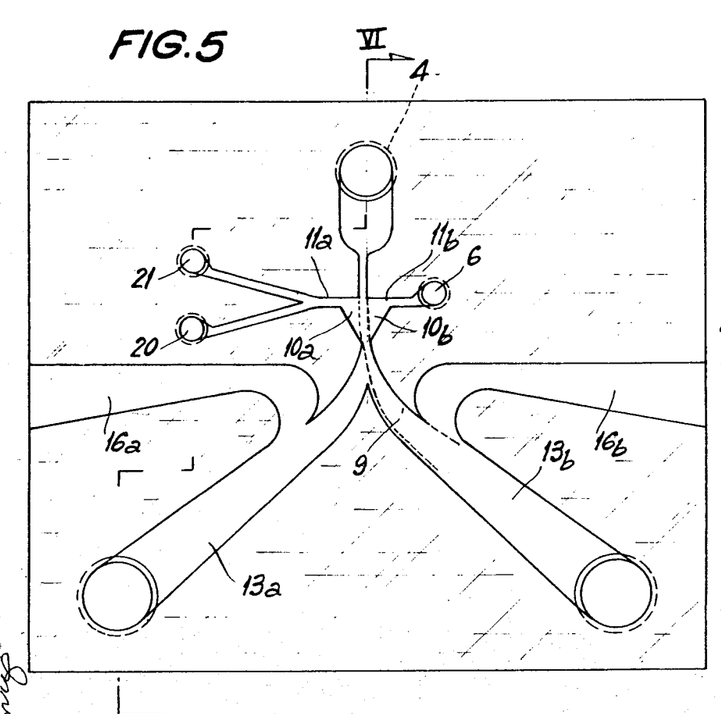
FIGURES 5 and 6 are pairs of views, similar to the pairs formed by the preceding figures, but relating to a logic element for performing the "and" function.
Figures 6, 11:
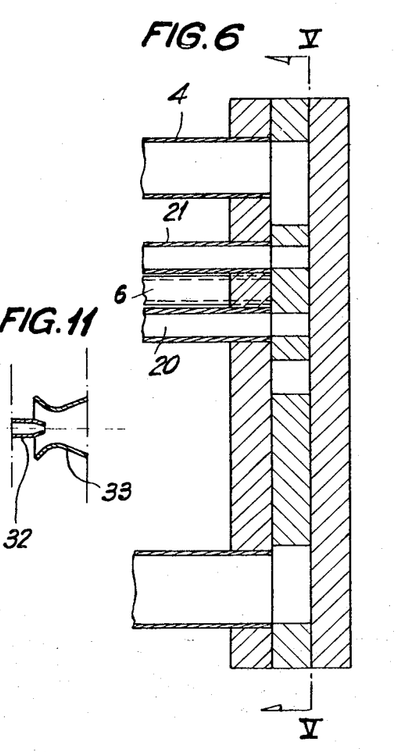
FIGURE 11 is a sectioned view of an aerodynamic valve facility.

FIGURES 5 and 6 show one possible use of a monostable element as an active "and" circuit. The nozzle 8 is offset to the left from the output orifice 12. It is assumed that the device is supplied, e.g. with compressed air, via the tubing, The actuating passage 11b and the ducts 16a, 16b are connected to atmosphere. The actuating passage 11a branches into a number, e.g. two, of channels which extend to relatively large-diameter tubes 20, 21. The ratio of the nozzle exit orifice to the chamber output orifice 12 is such that a slight positive pressure tends to be produced in the chamber 10. If the passages 6, 20, 21 are connected to atmosphere the stream 9 goes through the preferred passage 13b. If e.g. mechanical means or an appropriate back pressure are used to block just one of the tubes 20 or 21, nothing occurs; to make the element "flip-flop" - i.e., to make the stream 9 flow through the passage 13a instead of the passage 13b - the tubes 20 and 21 must be closed simultaneously. The element therefore provides the "and" function.

Through the agency of the facility shown in FIGURE 11, back pressure applied to just one of the ducts 20 or 21 is prevented from causing the element to flip-flop. The facility shown in FIGURE 11 comprises an injector 31 which can be supplied e.g. with pressure fluid from an output of a previous logic element; the facility also comprises a large cross-section diffuser 33 connected to one of the tubes or ducts 20 or 21, the other of which also has a facility similar to the facility shown in FIGURE 11. Operation is as follows:

When supplied with pressure fluid the injector produces a positive pressure in the diffuser 33 and therefore in one of the ducts 20 or 21; when the injector is not so supplied, the diffuser 33 is at ambient pressure. If just one of the injectors associated with the ducts 20, 21 is energised, the control pressure in the compartment 10a remains very near ambient pressure since delivery is via the other control and does not cause flip-flopping.

Figures 7, 8:
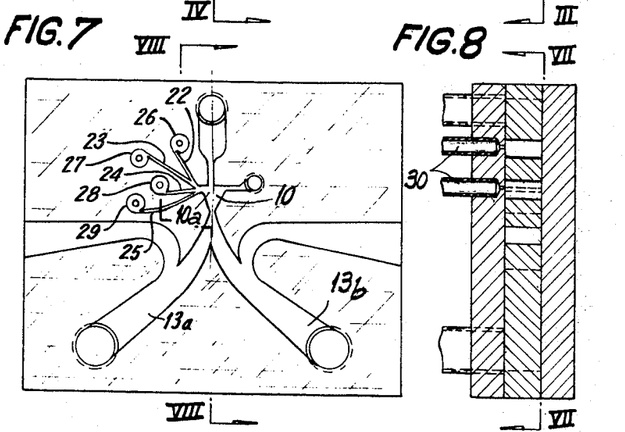
FIGURES 7 and 8 are a pair of views, similar to FIGURES 5 and 6 but of a logic element for performing the "or-nor" function.

In the variant shown in FIGURES 7 and 8, the element is again of the monostable kind, with a tendency for the pressure to increase in the chamber 10. The control passage 11a is connected by passages 22-25 to a number - e.g. four - of "fluid diodes" 26-29 which, of course take the form of a cylindrical capacity comprising a tangential nozzle and a central nozzle. The pressure loss is much greater for fluid movements from the tangential towards the central nozzle than vice versa. In this example the four passages 22-25 are connected to the tangential nozzles of the corresponding fluid diodes 26-29, the central nozzles thereof being connected to control passages 30. If none of the central nozzles is closed, the logic element delivers to the preferred or privileged passage 13b. The nozzles are so calibrated that energisation of any single one of them leads to a sufficient pressure increase in chamber compartment 10a for the main stream to change over from passage 13b to passage 13a. The flow through the passage 13a therefore corresponds to the "NOR" function and the flow through the passage 13a corresponds to the "OR" function.

Figures 9, 10:
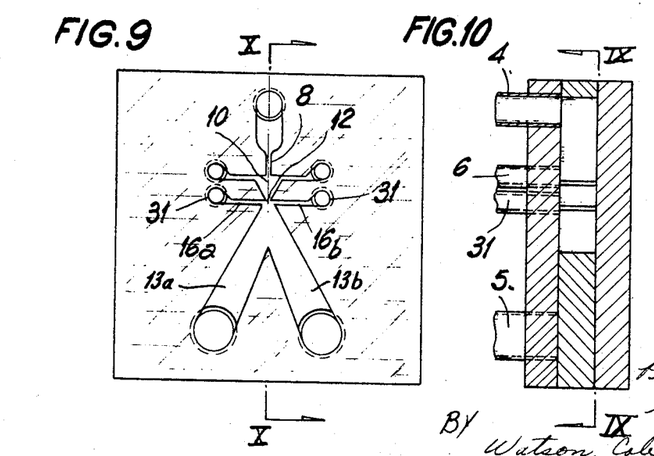
FIGURES 9 and 10 form another similar pair of views but relating to an alternative construction of the exit passages and leakage ducts of the element.

The variant shown in FIGURES 9 and 10 is similar to the embodiment shown in FIGURES 1 and 2 except that the output passages 13a, 13b are straight and the leakage ducts 16a, 16b are disposed immediately after the chamber output orifice 12 and extend to tubes or passages 31.

Figure 12:
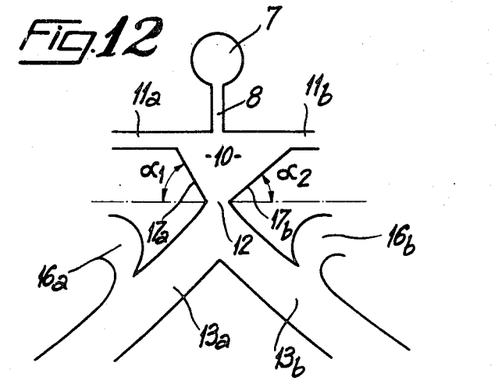
FIGURE 12 is a diagrammatic view in longitudinal section of an asymmetrical trigger to show the effects of the reflecting-wall angles on trigger operation.

Referring now to FIGURE 12, bistable or monostable logic elements can be devised on the basis of appropriately determining the angles $\alpha_1$, $\alpha_2$ formed by the convergent reflecting walls 17a, 17b of the chamber 10 with a perpendicular to the direction of the main stream leaving the nozzle 8. If the output or exit orifice 12 is disposed opposite the nozzle and if $\alpha_1 = \alpha_2$, the element is symmetrical and is a bistable trigger. If it is asymmetrical, for instance, if $\alpha_2$ is less than $\alpha_1$, the trigger is monostable, provided that the difference between $\alpha_1$ and $\alpha_2$ is enough. $\alpha_1$ is usually from 50 to 80°, preferably 60°, in which event the preferred value of $\alpha_2$ for a monostable trigger is 40°. The trigger shown in in FIGURE 12, for which these values are used, is monostable and the passage 13a is the preferred output passage.

Figure 13:
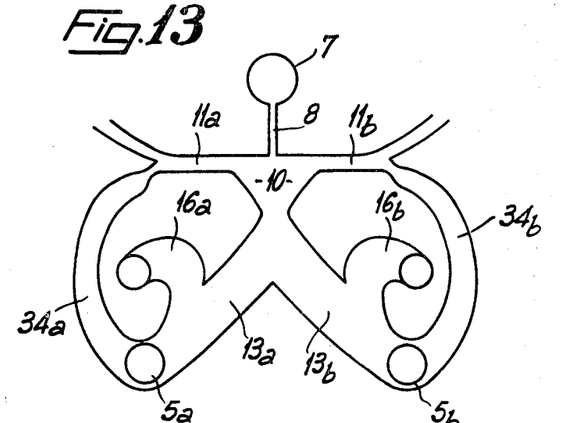
FIGURE 13 is a view similar to FIGURE 12 showing a logic element with negative feedback derived from the exit passages.

As previously stated, since the reflecting walls deflect the main stream, the same is deflected towards the actuation side; consequently, an active form of negative feedback can be provided in the nozzle element by means of a passage which remains in the same plane, such plane being the general plane of the element. Referring to FIGURE 13, each of the output orifices 5a, 5b to which the output passages 13a, 13b extend is connected to the corresponding control passage 11a, 11b by a respective negative feedback duct or passage 34a, 34b which are disposed at an obtuse angle after the passages 13a, 13b to ensure sufficient recovery of dynamic pressure for negative feedback to occur even when the output is not loaded. If the output is gradually loaded, the negative feedback increases, with increasing inhibition of the main stream. Consequently, the output can be fully loaded and, indeed, the output pressure can be artificially increased (by an auxiliary supply) beyond the maximum pressure of which the device is capable, but no accidental flip-flopping occurs. This overload feature may be invaluable in cases in which the logic element is used to control a closed-capacity device, such as a manocontactor, disposed some distance away; if the supply pressure varies, a temporary overload on the line can exist.

Figure 14:
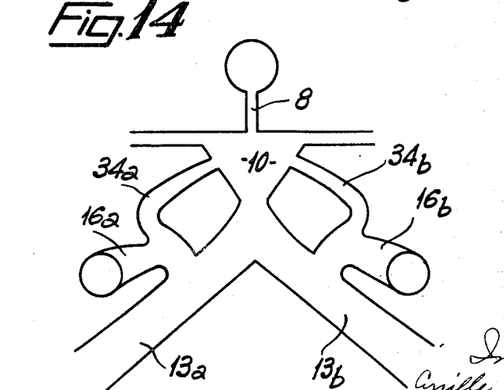
FIGURE 14 is a view similar to FIGURE 13 except that the negative feedback is derived from the passages communicating with atmosphere.

When it is required to recover maximum delivery at zero pressure or when the geometry of the installation including the element does not lend itself to the provision of a reaction loop (e.g. in the case of an integrated circuit), the negative feedback passages 34a, 34b can, with advantage, be connected to the passages 16a, 16b, communicating with atmosphere, and this feature is shown in FIGURE 14. The amount of negative feedback is small when the output impedance is small, but increases progressively in proportion as the load increases, since the delivery to atmosphere increases. Consequently, this feature can be used for all load values only in the case of bistables (symmetrical elements); with monostables the load on the normally unsupplied channel must be high enough. In FIGURE 14 the negative feedback passages extend directly to the chamber 10, a feature which helps to save space.

Figure 15:
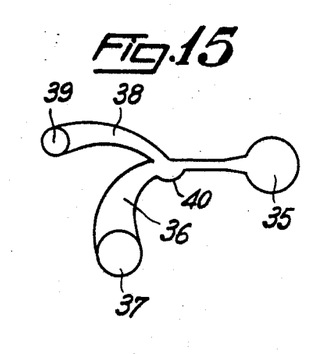
FIGURE 15 is a view in longitudinal section of an isolating circuit.

FIGURE 15 diagrammatically shows an isolating circuit comprising a receiver capacity 35 connected by a direct passage 36 to orifice 37 communicating with atmosphere. Extending into passage 36 is a passage 38 connected to a tube 39 via which a signal may arrive. Duct or passage 38 makes an appreciable angle with passage 36; opposite the place where passage 38 meets passage 36 is a concavity 40. The isolating circuit can be considered to be a fluid diode; a pressure pulse transmitted through the tube 39 reaches the capacity 35 directly, whereas fluid transmitted into the capacity 35 goes through the passage 36 towards the orifice 37 without any delivery or appreciable pressure variation occurring in the duct 38. A circuit of this kind associated with the control channel helps to decouple the fluid circuits from one another.

Figure 16:
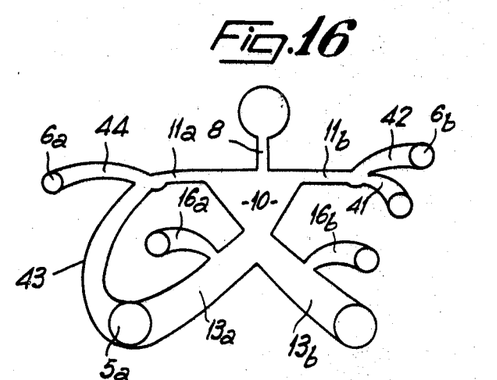
FIGURE 16 is a view in longitudinal section of a bistable logic element having a preferred orientation.
Figure 17:
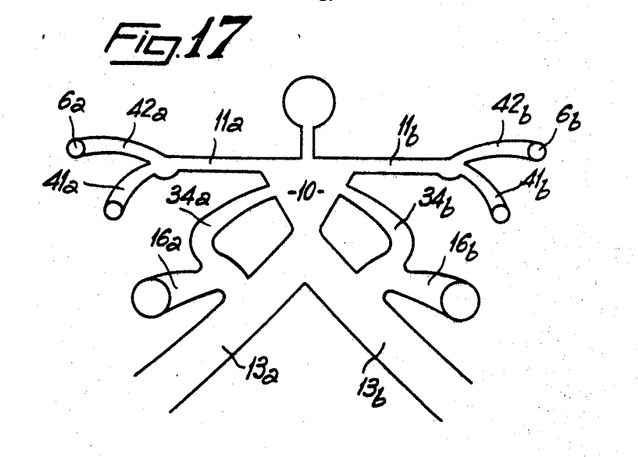
FIGURE 17 is a view similar to FIGURE 16 and shows a logic element in which each control passage is combined with an isolating circuit.
Figure 18:
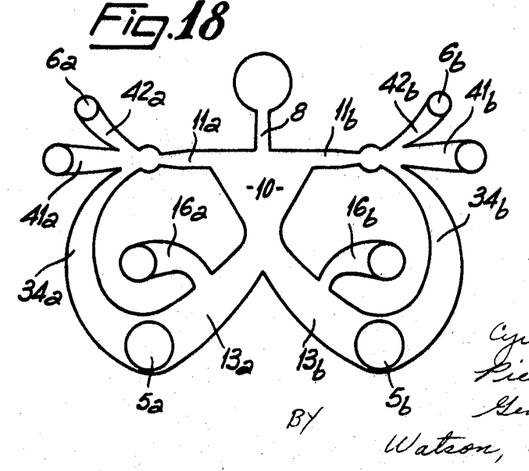
FIGURE 18 is a view similar to FIGURES 16 and 17 and shows a logic element having double-input isolating circuits.

FIGURES 16-18 show examples of logic elements in which an association of the kind just mentioned is used. A negative feedback produces a pressure rise in the element reflection chamber 10. The pressure rise might reach the control passages and disturb the circuits connected thereto, for instance in cases in which the same signal controls two logic elements. The use of an isolating circuit protects the control channels from the effects of such positive pressure and also ensures that excessive actuating pressure does not act via the trigger on the opposite control channel (a phenomenon known as "transparency" of the trigger).

In the embodiment shown in FIGURE 16 the element has an asymmetrical reflection chamber 10, the output passage 13b being privileged or preferred. The corresponding control passage 11b is combined with an isolating circuit whose chamber 10 forms the receiving capacity; the direct passage 41 communicates with atmosphere and the signal arrival duct 42 is connected to the control passage or orifice 6b of the logic element. The other control passage 11a is similarly connected to the output orifice 5a - via a direct passage 43, which serves as negative feedback passage for the normally unstable passage 13a - and to the actuating passage or orifice 6a via a branch duct 44. The resulting element is a bistable element having a preferred orientation. At start-up and in the absence of control, delivery is via the normally supplied passage 13b. Consequently, there is no ambiguity at start-up. Upon cessation of the control, whichever passage was supplied continues to be supplied until the next change of control.

The element shown in FIGURE 17 is symmetrical and, as in the case shown in FIGURE 14, has negative feedback ducts 34a, 34b which connect to the chamber 10 the passages 16a, 16b communicating with atmosphere. Each control passage 11a, 11b is combined with an isolating circuit whose direct passage 41a, 41b communicates with atmosphere, a branched passage or duct 42a, 42b being connected to the control passage or orifice 6a, 6b. This feature is advantageous inter alia if the control signal is small on reduced load.

The device shown in FIGURE 18 has negative feedbacks connected to the output orifices in the manner described with reference to FIGURE 13. Each control passage 11a, 11b is combined with an isolating circuit having two input ducts; the direct passage 41a or 41b communicates with atmosphere and the input ducts take the form of one of the negative feedback ducts 34a or 34b and the other of a branched duct connected to the input orifice (sic) 6a or 6b of the logic element. This feature precludes pressure rises in the control passages.

The embodiments hereinbefore described can of course be modified, inter alia by the substitution of equivalent technical means, without for that reason departing from the scope of this invention.

We claim:
1. A fluid logic element comprising:
    a reflection chamber (10) provided with an inlet nozzle (8) to deliver a fluid stream (9) into said chamber, said fluid stream defining two separate compartments in said chamber;
    said chamber being bounded by:
    an upstream transverse wall into which said inlet nozzle opens and which has a substantial extent with respect to the width of said nozzle;
    and partly by two opposite stream reflecting sidewalls (17a, 17b) extending downstream of said upstream transverse wall, converging downstream and ending with edges spaced from each other, said edges defining partly a discharge orifice (12), the width of which is substantially equal to the width of said nozzle and being followed by divergent attachment walls (14a, 14b);
    said inlet nozzle being arranged in said upstream transverse wall in laterally spaced relationship with respect to the upstream ends of said downstream converging side walls;
    and control passages (11a, 11b) between the upsteam ends of said downstream converging walls and said upstream transverse wall to selectively admit pressure fluid into said separate compartments to increase the pressure therein; whereby said fluid stream is displaced by the increase of pressure in one of said two compartments towards the sidewall bounding the other compartment and is reflected by said sidewall towards the attachment wall following the sidewall which bounds said one compartment.

2. The logic element set forth in Claim 1, wherein said reflection chamber is disposed symmetrically of the nozzle centre plane so that said logic element is bistable.

3. The logic element set forth in Claim 1, wherein the width of said discharge orifice is less than the width of said stream at said inlet nozzle so that in operation there is produced a pressure which tends to increase in said reflection chamber.

4. The logic element set forth in Claim 1, wherein the kind of stability of said logic element is determined by an appropriate choice of the angles made by said convergent walls of said reflection chamber with the direction of said stream at its exit from said nozzle.

5. The logic element set forth in Claim 1, wherein said reflection chamber is of triangular cross-section and said nozzle extends into said chamber perpendicularly to one side thereof, said exit orifice being disposed at the opposite vertex of said triangular chamber, and said control passages extending to the respective vertices of said triangular chamber adjacent said one side of said chamber.

6. The logic element set forth in Claim 5, wherein said triangular chamber is substantially equilateral.

7. The logic element set forth in Claim 5, wherein for a bistable logic element there are two said control passages combined with isolating circuits having direct passages connected to atmosphere.

8. The logic element set forth in Claim 7, wherein each said isolating circuit comprises a second branch duct in the form of a negative feedback duct connected to the trigger exit.

9. The logic element set forth in Claim 5, wherein said logic element comprises at least one active negative feedback in the form of a duct which remains in its plane.

10. The logic element set forth in Claim 9, wherein the or each negative feedback duct connects an exit channel of said trigger to the corresponding control passage.

11. The logic element set forth in Claim 10, wherein the or each negative feedback duct is connected to the corresponding exit passage at an obtuse angle so as to recover enough dynamic pressure for the negative feedback to be operative even when the exit is unloaded.

12. The logic set forth in Claim 9, wherein the or each negative feedback duct is connected to a trigger passage connected to atmosphere.

13. The logic element set forth in Claim 12, wherein the or each negative feedback duct extends to said reflection chamber.

14. The logic element set forth in Claim 1, wherein an exit passage is associated with each of said divergent walls, and leakage ducts are associated with said exit passages.

15. The logic element set forth in Claim 14, wherein said leakage ducts are connected to said exit passages at acute angles to provide an aspirator effect.

16. The logic element set forth in Claim 14, wherein said leakage ducts are connected to said exit passages immediately after said reflection chamber exit orifice.

17. The logic element set forth in Claim 14, including at least one isolating circuit, in the form of a receiver capacity, connected to one of said exit passages via a direct passage and to one of said control orifices via a branch duct.

18. The logic element set forth in Claim 17, wherein said capacity is said reflection chamber, said branch duct extends to said one of said control orifices of said logic element, and the corresponding control passage forms part of said direct passage.

19. The logic element set forth in Claim 17, wherein the control passage on the side of a non-privileged passage of a monostable logic element is combined with an isolating cirucit whose direct passage serves as a negative feedback duct, the other control passage being combined with an isolating circuit whose direct passage is connected to atmosphere.

20. The logic element set forth in Claim 1, wherein said reflection chamber is disposed asymmetrically of the nozzle central plane so that one of said attachment walls is a preferred one, said logic element therefore being monostable.

21. The logic element set forth in Claim 20, wherein said reflection chamber compartment on the side opposite said preferred attachment wall is connected to fluid diodes devised so that closure of any one of said diodes is sufficient to change over said stream whereby the monostable element serves as an active "or-nor" circuit.

22. The logic element set forth in Claim 20, characterised in that said reflection chamber on the side opposite said preferred attachment wall is connected to a number of relatively large control tubes, said discharge orifice being smaller than the width of said inlet nozzle so as to produce a slight overpressure in said reflection chamber, whereby the monostable logic element serves an as active "and" circuit.

23. The logic element set forth in Claim 22, wherein aerodynamic valve facilities are associated with said large control tubes to obviate backpressure effects.

UNITED STATES PATENT OFFICE
CERTIFICATE OF CORRECTION

Patent No. 3,524,461     Dated Aug. 18, 1970

Inventor(s) Cyrille F. Pavlin, et al

It is certified that error appears in the above-identified patent and that said Letters Patent are hereby corrected as shown below:

Claim 8, line 3, substitute --an exit passage-- for "the trigger exit";

Claim 10, line 2, substitute --passage-- for "channel";

Claim 10, line 3, substitute --element-- for "trigger";

Claim 12, line 2, delete "trigger" before "passage".

SIGNED AND
SEALED
MAR 9 1971

(SEAL)
Attest:

Edward M. Fletcher, Jr.
Attesting Officer

WILLIAM E. SCHUYLER, JR.
Commissioner of Patents